(12) United States Patent
Chaudhary et al.

(10) Patent No.: US 7,853,019 B1
(45) Date of Patent: Dec. 14, 2010

(54) TAPE FAILOVER ACROSS A CLUSTER

(75) Inventors: Anant Chaudhary, Foster City, CA (US); Andrew Narver, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 843 days.

(21) Appl. No.: 11/606,508

(22) Filed: Nov. 30, 2006

(51) Int. Cl.
*H04L 9/08* (2006.01)
*H04L 29/06* (2006.01)
*G06F 12/14* (2006.01)
*G06F 17/30* (2006.01)
*G06F 3/06* (2006.01)
*G06F 13/00* (2006.01)
*G06F 17/00* (2006.01)
*G06F 12/00* (2006.01)

(52) U.S. Cl. .................. 380/278; 713/153; 713/165; 713/189; 726/26; 711/4; 711/100; 711/162; 711/163; 707/609; 707/641; 707/670; 707/687; 707/821

(58) Field of Classification Search ............... 380/278; 713/153, 165, 189; 726/26; 711/4, 100, 711/162, 163; 707/609, 641, 670, 687, 821
See application file for complete search history.

(56) References Cited

U.S. PATENT DOCUMENTS

| 1,310,719 A | 7/1919 | Vernam |
| 4,262,329 A | 4/1981 | Bright et al. |
| 4,558,176 A | 12/1985 | Arnold et al. |
| 4,731,840 A | 3/1988 | Mniszewski et al. |
| 4,757,533 A | 7/1988 | Allen et al. |
| 5,058,162 A | 10/1991 | Santon et al. |
| 5,185,717 A | 2/1993 | Mori |
| 5,235,641 A | 8/1993 | Nozawa |
| 5,265,159 A | 11/1993 | Kung |
| 5,375,243 A | 12/1994 | Parzych et al. |
| 5,495,533 A | 2/1996 | Linehan et al. |
| 5,677,952 A | 10/1997 | Blakeley, III et al. |

(Continued)

OTHER PUBLICATIONS

Anderson, et al., "The Steganographic File System," Information Hiding, Second International Workshop, IH '98 Portland, Oregon. USA, Apr. 14-17, 1998, Proceedings, pp. 73-82, 1998.

(Continued)

*Primary Examiner*—Aravind K Moorthy
(74) *Attorney, Agent, or Firm*—Cesari and McKenna, LLP

(57) ABSTRACT

A security appliance that encrypts and decrypts information is installed in each of redundant multi-paths between a host system and a back up tape storage system. The host system is arranged to detect failures in a primary path to the tape system being used. When the failure is detected, the host system enables transfers to the same tape system through an alternative path. Encryption keys and host/tape designators (identifiers) are broadcast among the security appliances in the alternative data paths. When the host system switches from the primary path to the secondary path, even though the secondary security appliance did not generate the encryption keys, the secondary path security appliance will have such keys and will properly encrypt and transfer data from the host to the tape system. The secondary will also properly retrieve encrypted data from the tape system, decrypt it and deliver it to the host. All of these operations will be transparent (invisible) to a running application in the host.

23 Claims, 5 Drawing Sheets

U.S. PATENT DOCUMENTS

| | | | |
|---|---|---|---|
| 5,687,237 | A | 11/1997 | Naclerio |
| 5,870,468 | A | 2/1999 | Harrison |
| 5,931,947 | A | 8/1999 | Burns |
| 5,933,498 | A | 8/1999 | Schneck et al. |
| 5,940,507 | A | 8/1999 | Cane |
| 6,073,237 | A | 6/2000 | Ellison |
| 6,134,660 | A | 10/2000 | Boneh et al. |
| 6,199,163 | B1 | 3/2001 | Dumas et al. |
| 6,212,600 | B1 | 4/2001 | Friedman et al. |
| 6,249,866 | B1 | 6/2001 | Brundrett |
| 6,345,101 | B1 | 2/2002 | Shukla |
| 6,356,941 | B1 | 3/2002 | Cohen |
| 6,405,315 | B1 | 6/2002 | Burns et al. |
| 6,414,884 | B1 | 7/2002 | DeFelice et al. |
| 6,507,911 | B1 | 1/2003 | Langford |
| 6,550,011 | B1 | 4/2003 | Sims, III |
| 6,735,693 | B1 | 5/2004 | Hamlin |
| 6,839,437 | B1 | 1/2005 | Crane et al. |
| 6,857,076 | B1 | 2/2005 | Klein |
| 6,915,435 | B1 | 7/2005 | Merriam |
| 7,003,674 | B1 | 2/2006 | Hamlin |
| 7,020,779 | B1 | 3/2006 | Sutherland |
| 7,093,127 | B2 | 8/2006 | McNulty et al. |
| 7,096,355 | B1 | 8/2006 | Marvit et al. |
| 7,215,771 | B1 | 5/2007 | Hamlin |
| 7,240,197 | B1 | 7/2007 | Yamagami et al. |
| 7,260,724 | B1 | 8/2007 | Dickinson et al. |
| 2002/0138747 | A1* | 9/2002 | Clarke .................. 713/189 |
| 2003/0028765 | A1 | 2/2003 | Cromer et al. |
| 2004/0139240 | A1* | 7/2004 | DiCorpo et al. ............. 710/3 |
| 2007/0112677 | A1* | 5/2007 | Witt et al. ................ 705/50 |
| 2008/0065898 | A1* | 3/2008 | Greco et al. ............ 713/185 |
| 2008/0144826 | A1* | 6/2008 | Chang ................... 380/269 |

OTHER PUBLICATIONS

Antonelli, et al., "The Packet Vault: Secure Storage of Network Data," CITI Technical Report 98-5, pp. 1-15, Jun. 25, 1998.

Bashand, et al., "IBM Magstar Tape Drives—AIX High Availability SAN Failover for 3590," IBM Magstar Tape Drives—SAN Failover Compatibility, IBM Corporation, Tucson, AZ, 10 pages, Jun. 12, 2001.

Blaze, "Oblivious Key Escrow," Information Hiding, First International Workshop, Cambridge, UK, May 3D-Jun. 1, 1996, Proceedings, pp. 335-343, 1996.

Blaze, "A cryptographic File System for Unix," Proceedings of the First ACM Conference on Computer and Communications Security, pp. 9-16 (1993).

Blaze, "Key Management in an Encrypting File System," USENIX Summer 1994 Technical Conference, pp. 27-35, (Jun. 6-10, 1994).

Boneh, et al., "A Revocable Backup System," In Proceedings 6th USENIX Security Conference, pp. 91-96, 1996.

Cattaneo, et al. "The Design and Implementation of a Transparent Cryptographic Filesystem for UNIX," Proceedings of The FREENIX Track: 2001 UNIX Annual Technical Conference. pp. 199-212 (Jun. 25-30. 2001).

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology—EUROCRYPT '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing. Proceedings of the Northeast ACM Symposium on Personal Computer Security, pp. 38-45 (1986).

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes, " IBM Technical Disclosure Bulletin, pp. 444-445, Feb. 1991.

"Disappearing Inc. Makes Old Email Vanish Everywhere; Reduces Corporate Liability as well as Improves Corporate Productivity by Enabling Sensitive Communications via Email-Company Business and Marketing," Edge: Work-Group Computing Report, http://findarticles.com/p/articJes/mLmOWUB/is_1999_0cU 1/aL 56260487/print (Oct. 11, 1999).

Double, "Encryption Key Security by Electric Field Destruction of Memory Cells," IBM Technical Disclosure Bulletin, pp. 8-11, Jan. 1989.

FIPS PUB 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

FIPS PUB 140-1, "Security Requirements for Cryptographic Modules," Federal Information Processing Standards Publication 140-1, National Institute of Standards and Technology, Jan. 11, 1994, 44 pages.

Flavin, et al., "Data Protection on Magnetic Media Via an Encrypting Controller," IBM Technical Disclosure Bulletin, vol. 3D, No. 3, pp. 1284-1285 (Aug. 1987).

Garfinkel, S., "PGP: Pretty Good Privacy," O'Reilly & Associates, pp. 43 and 65-67, Jan. 1995.

Garfinkel, S., "PGP: Pretty Good Privacy," O'Reilly & Associates, pp. 54-55, 151-153, Jan. 1995.

Garfinkel, S., "Omniva's Self-Destructing Email," Web Security, Privacy and Commerce, Second Edition, O'Reilly & Associates, Inc., Sebastopol, CA, pp. 280-283, Jan. 2002.

Gobioff, Howard, et al., "Security for Networked Attached Storage Devices," Carnegie Mellon University Computer Science Technical Report CMU-CS-97-185, Oct. 1997, 20 pages.

Gobioff, Howard, "Security for a High Performance Commodity Storage Subsystem," Carnegie Mellon University Computer Science Technical Report CMU-CS-99-160, Jul. 1999, 222 pages.

Gobioff, Howard, et al., "Smart Cards in Hostile Environments," Proceedings of the Second USENIX Workshop on Electronic Commerce, pp. 23-28 (Nov. 18-21. 1996).

Graham, et al, "Data Protection at the Volume Level," IBM Technical Disclosure Bulletin, pp. 146-148, Oct. 1988.

Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25,1996).

Hwang, et al., "An Access Control Scheme Based on Chinese Remainder Theorem and Time Stamp Concept," Computers & Security, vol. 15. No. 1. pages 73-81,1996.

IBM Crypto Server Management General Information Manual, First Edition (May 2000), 16 pages.

IBM SecureWay Cryptographic Products IBM 4758 PCI Cryptographic Coprocessor Installation Manual, Security Solutions and Technology Department, Second Edition (Mar. 2000), 34 pages.

IBM Integrated Cryptographic Coprocessors for IBM eServer zSeries 900 and for IBM S/390 Servers (Data sheet), 2000, 4 pages.

IBM SecureWay, UltraCypher Cryptographic Engine (Datasheet) (1998), 2 pages.

IBM 4758 PCI Cryptographic Coprocessor Custom Software Installation Manual, Second Edition, Jan. 2001, 30 pages.

Avoid Litigation: Encrypt Your Data, InfoTech Research Group, Sep. 19, 2006, 6 pages.

Itoi, "SC-CFS: Smartcard Secured Cryptographic File System," CITI Technical Report 01-6, Center for Information Technology Integration, University of Michigan, Jan. 16, 2001, 11 pages.

Johnson et al., "Self-Destructing Diskette," IBM Technical Disclosure Bulletin, vol. 33, No. 1A, pp. 218-219 (Jun. 1990).

Mallett, "Considerations for Applying Disk Encryptors 10 Environments Subject to Hostile Overrun," IEEE, pp. 218-222, 1991.

Mauriello, "TCFS: Transparent Cryptographic File system," Linux Journal, Aug. 1, 1997, 8 pages.

Menezes et al. "Handbook of Applied Cryptography," CRC Press, pp. 1-794, 1997.

Moore, "Preventing Access to A Personal Computer," IBM Technical Disclosure Bulletin, pp. 98-100, Sep. 1992.

Omniva Policy Systems, www.omniva.com, (Aug. 2004), downloaded from web.archive.org on Aug. 24, 2004, 19 pages.

Provos, Niels, "Encrypting Virtual Memory," CITI Technical Report 00-3, Center for Information Technology Integration, University of Michigan, Apr. 25, 2000, 11 pages.

Scherzer. "Memory Protection in Chip Cards," IBM Technical Disclosure Bulletin, pp. 416-417, Oct. 1989.

Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.

Slusarczuk et al., "Emergency Destruction of Information Storage Media," Institute for Defense Analysis, IDA Report R-321, Dec. 1987, 196 pages.

Smith, "Verifying Type and Configuration of an IBM 4758 Device: A While Paper," IBM T.J. Watson Research Center pp. 1-7 (218/00).

Smith et al., "IBM Research Report: Building a High-Performance, Programmable Secure Coprocessor," IBM Research Division, Computer Science/Mathematics, RC 21102(94393) (Feb. 19, 1998), 61 pages.

Stinson, Douglas R., "Cryptography: Theory and Practice," CRC Press, Mar. 1, 1995, 228 pages.

Vernam, "Cipher Printing Telegraph Systems for Secret Wire and Radio Telegraphic Communications," Journal of the AI EE. pp. 109-115, Feb. 1926.

Weingart, "Physical Security for the uABYSS System," Proceedings 1987 IEEE Symposium on Security and Privacy, pp. 2-58 (Apr. 27-29, 1987), pp. 52-58.

Whitten et al., "Usability of Security: A Case Study," CMU Computer Science Technical Report CMU-CS-98-155. pp. 1-39, Dec. 18, 1998.

Yee et al., "Secure Coprocessors in Electronic Commerce Applications," Proceedings of the First USENIX Workshop of Electronic Commerce, pp. 155-170, Jul. 11-12, 1995.

Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).

Zadok et al., "Cryptfs: A Stackable Vnode Level Encryption File System," Computer Science Department, Columbia University, CUCS-021-98, pp. 1-14, Jun. 1998.

* cited by examiner

TAPE FAILOVER ACROSS A CLUSTER

BACKGROUND OF THE INVENTION

1. Field of the Invention

The present invention relates to networked magnetic storage tape systems, and more particularly to tape systems connected via a tape driver system that provide tape failover capability. Tape failover refers to having alternative paths between a host and a tape system, where when one path fails the other path is seamlessly enabled and the first path disabled.

2. Background Information

One tape failover system was developed by IBM for backing up system memories of host computer systems and is referred to as Atape driver running under the AIX operating system. Atape driver refers to IBM AIX Enhanced Tape and Medium Changer Device Driver. AIX is a proprietary operating system developed by IBM based on a UNIX system. AIX comes from Advanced IBM Unix or, more recently, from Advanced Interactive eXective. For more discussion on the Atape driver and AIX, see IBM publication, entitled, *IBM Magstar Tape Drives—AIX High Availability SAN Failover for 3590*, by Rob Bashand and Jim Ayres, and published Jun. 12, 2001 by IBM Corp., Tucson, Ariz., U.S.A. This publication is incorporated herein by reference.

The AIX Atape driver provides up to fifteen alternative parallel paths to a single tape drive system. When a failover occurs, the Atape driver will enable one of the alternative paths invisibly to applications running on the host computer system.

Operations of tape back up systems are well known in the art, and are only briefly described herein. Generally, the first block, block 0, is written by the host onto a blank tape. Block 0 will contain label and header-type information, e.g. index of files within the image, etc., so that the tape and its contents can be identified by the host. Block 0 is written and data blocks or files are then sequentially written onto the tape. The tape may be physically unloaded from the tape drive and stored. When the host system memory needs to be restored, the tape is reloaded onto the tape drive, the host reads block 0 and replaces the host's memory contents with the data from the tape. Protocols, file structures, error detection and correction that are used for these operations are well known in the art. If there is a failover, the Atape driver enables an alternative path to the tape system, and operations continue as if there were no failure.

Consider a tape failover environment, wherein a security appliance or system is located "in-line" in each of the separate paths running from a host system to a single tape system. The security appliance is configured to encrypt data generated by the host system for secure storage on the tape system. In such an environment, block 0 will contain encryption information. The security appliance encrypts data coming from the host and delivers it to the tape and decrypts data coming from the tape system (when the tape is restoring the host memory) and delivers it to the host. The Host/Atape driver and tape systems operate as though the security appliance was not there.

Limitations, however, occur since one security appliance may NOT have the encryption key for a tape written through another security appliance. If a failover occurs, the Atape driver diverts the data flow to an alternative path. The operation will fail, however, since the encryption key is not known to the security appliance in the alternative path.

The present invention is concerned, inter alia, with the above limitations.

Encryption systems and keys are well known in the art, including public/private key operations, and these systems and processes are generically described as they apply to specific operations in examples of the present invention. The use herein of "encryption key" refers to all the encryption information needed to encrypt and decrypt data.

SUMMARY OF THE INVENTION

The limitations of the prior art are addressed by providing a system for tape failover across a cluster of security appliances coupled between a host system and a tape back up system. According to the invention, when the data on a tape is encrypted, the encryption key may be broadcast to all security appliances in the cluster. This allows the other encryption devices, that provide alternative paths (APs) between a host system and a tape back up, to successfully encrypt and store the data onto the tape, and later decrypt the tape data retrieved from the tape. In a clustered system with alternative paths, one primary path and the other secondary paths, between a host system and a tape back up system, where all paths have in-line security appliances that encrypt and decrypt data, the security appliances must share the encryption data. When the host system writes to block 0 on the tape, the primary security appliance will have an encryption key and broadcast that key to other security appliances clustered with the primary. The secondary security appliances will have the encryption key and be able to encrypt and decrypt data traveling from host to tape and visa versa, if needed. The host, tape and security appliances may be assigned LUN's (Logical Unit Numbers) and WWN's (World Wide Numbers) or other equivalent designators or identifiers so that the devices will able to determine which security appliances in the primary path and which are in the alternative or secondary paths.

In other examples the encryption keys may be stored in an external key server.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
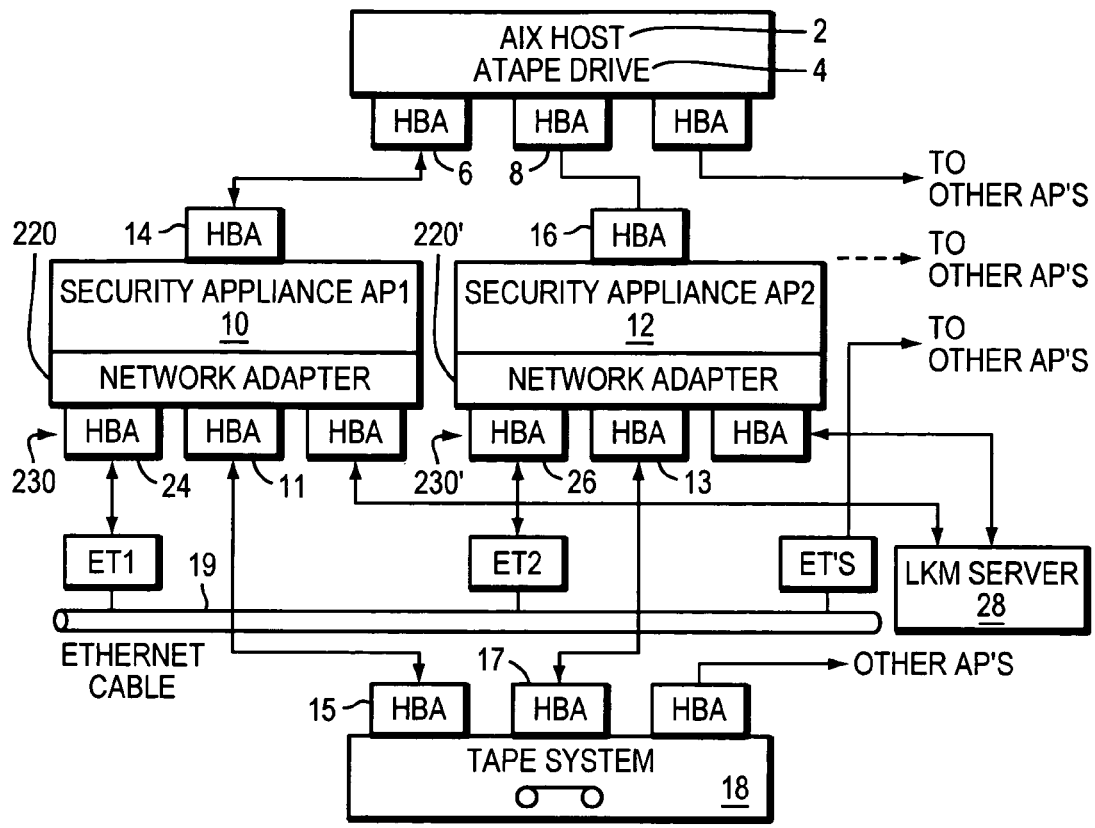
FIG. 1 is a block diagram/schematic illustrating a typical cluster of security appliances with one security appliance in each path from a host and a tape system.

FIG. 1 shows a host computer system running the AIX operating system (AIX host 2) and an Atape driver 4. HBA's 6, 8 (Host Bus Adapters) connect to two security appliances 10, 12, respectively, that are interconnected as a cluster providing alternative separate paths to a single tape system 18. The security appliances connect to the host HBA's 6 and 8 through separate HBA's 14 and 16, respectively. The two security appliances continue the two paths and connect to HBA ports 15 and 17, respectively, on the single tape system 18. The ports on the security appliances may mimic the sending and to receiving HBA's on the host and the tape system, respectively.

In this example, the tape system complies with the known FCP-2 (Fibre Channel Protocol-2) that contains an error recovery mechanism for FCP-2. At the protocol layer, re-tries are performed and recovery made, if possible. However, all such re-tries are via the same path from the host to the tape system, and, so, if a failover occurs along the path, the error recovery will also fail. Atape driver 4 addresses this type of failure by enabling an alternative path to the tape system. When a permanent error occurs on the primary path, the Atape driver automatically initiates error recovery and continues the operation on an alternative path (AP) without interrupting the application running on the host that initiated the back up operation. The Atape driver keeps track of the state of the tape system, any SCSI (Small Computer System Interface, which is often used with disk and tape systems) reservation, and current tape position. When a failover occurs the Atape driver will restore the previous system state, any SCSI reservation, and tape position prior to re-trying the failed operation.

As mentioned above, an Atape driver supports many alternative paths, but only two such paths are discussed in this example. Consider that the AIX/Atape driver host system selects the primary path via security appliance 10 and an alternative secondary path via security appliance 12. If during a back up operation, the primary path fails, the Atape driver detects the failure, e.g. by not receiving an acknowledgement from the tape system, and switches to the secondary path. However, the switch over will fail, as discussed herein, unless the security appliance in the secondary path has the necessary encryption key.

As discussed below, the encryption keys are, for example, generated by the security appliance when block 0 is written onto a tape. The SEP (Storage Encryption Processor—that could be any generic processor so arranged) 270 processor may generate the encryption key or an LKM (Lifetime Key Management Server which stands for any key server so arranged) 28, FIG. 1, may be used as a source of encryption keys.

The security appliance 10 comprises one or more network adapters 220 with HBA ports that physically connect to the Atape driver HBA 6 and to the tape system 18 HBA to port 15, respectively.

Similarly, the security appliance 12 has a network adapter 220' with HBA's that physically couple the Atape driver HBA 8 to the tape system 18, HBA port 17, respectively.

The network adapters 220 and 220' also contains, in this example, HBA's configured as Ethernet ports 24 and 26 that are correspondingly connected to an Ethernet cable 19. The security appliances 10, 12, . . . n, are all coupled together as a cluster that shares information via the Ethernet cable 19. However, as would be known to one skilled in the art, the coupling of the clustered security appliances among each other may be accomplished via point-to-point links in a daisy chain, star or tree configuration, or via wide area networks, virtual private networks implemented over a public network (Internet) or shared local area networks.

In this example, the connections from unit 10 to the Ethernet may be made via interface cards, HBA 24 and ET1, that have the mechanical, electrical and signaling circuitry needed to connect the security appliance 10 to the Ethernet cable 19. In this example, the file structure and control messaging used by the clustered security appliances over the Ethernet is the IP protocol. But as known to those skilled in the art many other hardware and software systems may be used for inter-communicating among security appliances.

In one example, the hardware/software arrangement used to connect the host system 2 to a tape system 18 is FC (Fibre Channel), but other commonly used configurations for networked storage networks, in this case back up tape systems, may be used. Some such arrangements include SCSI protocols, including SCSI encapsulated over TCP (iSCSI—Internet SCSI) and SCSI encapsulated over FC (FCP—Fibre Channel Protocol), wherein the network adapters 220 and 220' may comprise host bus adapters (HBAs) having the mechanical, electrical and signaling circuitry needed to connect the appliances to, for example, a FC network.

Figure 2:
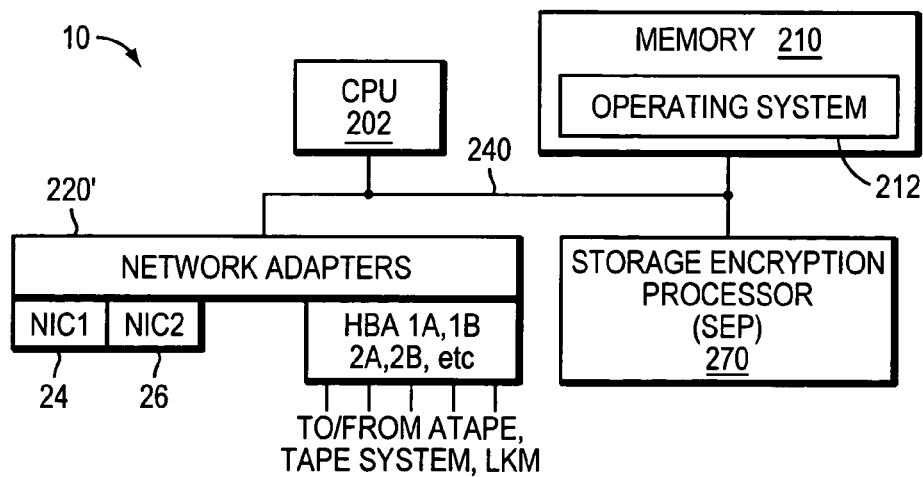
FIG. 2 is a block diagram of a security appliance.

FIG. 2 is a schematic block diagram of the multi-protocol security appliance 10 or 12 that may be advantageously used with the present invention. As used herein, a security appliance denotes a computer system having features such as security service management for users (system administrators) and clients for attached storage devices. The security appliance typically comprises at least one processor, e.g., central processing units (CPU 220), a memory 210, at least one network adapter 220 (or 220') and at least one storage encryption processor (SEP 390) interconnected by a system bus 240. The bus 240 may be a conventional Peripheral Component Interconnect (PCI) bus, or an address, data, control bus found for virtually any CPU. The SEP 270 is configured to perform all encryption and decryption operations for the security appliance and to protect the encryption information from retrieval via an external entity.

The memory 210 illustratively comprises storage locations that are addressable by the processors and adapters for storing software programs and data structures associated with the present invention. The processor and bus adapters may, in turn, comprise processing elements and/or logic circuitry configured to execute the software programs and manipulate the data structures. An operating system 212, portions of which are typically resident in memory and executed by the processing elements, functionally organizes the appliance 10 or 12 by, inter alia, invoking security operations in support of software processes run by the appliance.

The problem, mentioned above, is that the security appliance 12, when enabled as a secondary path, may not have the encryption key (in its cache or anywhere else) for a tape written through security appliance 10. This will happen if any of the clustered security appliances do not have the same encryption key. The security appliance 10 receives information for a tape when the tape is labeled, i.e. when block 0 is physically written on the tape. The security device 10 generates the encryption key at that time (or retrieves it from the LKM) and uses that key to encrypt data from the host and write that encrypted data onto the tape. The security appliance 10 also uses the encryption information to decrypt information coming from the tape to be restored to the host. However, if the tape was previously written to, and the Atape driver enabled a secondary path to the tape via security appliance 12, that different security appliance 12 has the encryption key (and device identification information) developed by the primary security appliance in order to function.

Figure 3:
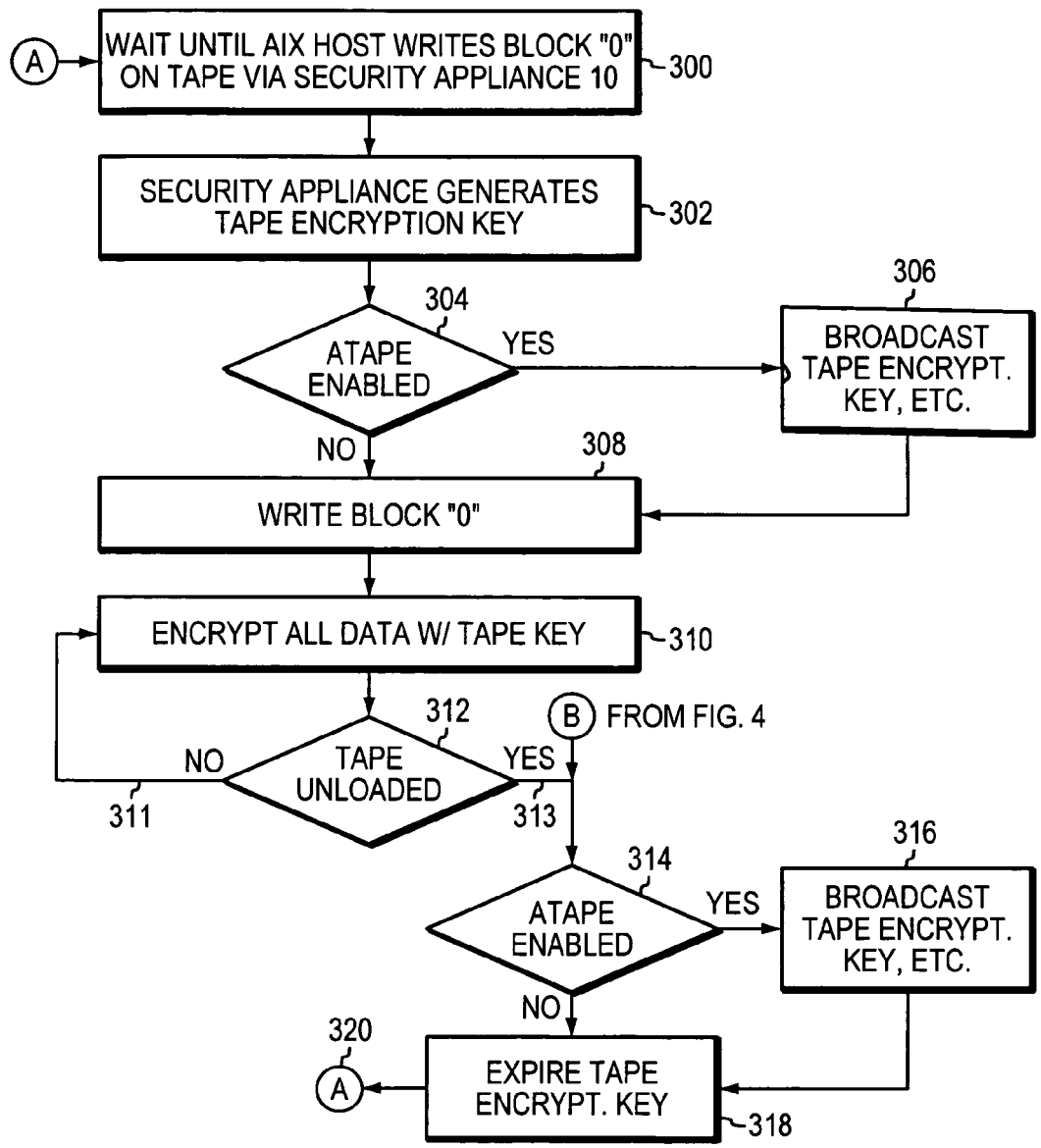
FIGS. 3, 4, 5 and 6 are flow chart examples illustrating the invention's operations.

FIG. 3 is a representative flow chart of steps illustrating the security appliance 10 operating as the primary path from the host to the tape system. The security appliance, as mentioned above, encrypts data to be stored on the tape and decrypts the data when restoring the data to the host.

In step 300, the host issues a write block 0 command to the tape via Atape driver 4 and security appliance 10. This may happen, for example, when a new tape is loaded onto the tape drive or when the system administrator so determines. The security appliance receives the write block 0 and generates an encryption key in step 302. With the tape failover driver operation enabled (the Atape Enabled in one embodiment) in step 304, the security appliance may broadcast at least the encryption information to all the security appliances clustered with security appliance 10 via the Ethernet cable 19. In step 308, the security appliance 10 then writes block 0 (in clear—not encrypted, although in other examples block 0 may be encrypted). Data sent by the host to the tape system is encrypted with the encryption key in step 310 and written onto the tape by the primary security appliance 10. If the primary path fails, the Atape driver 4 will detect the failure and switch from the primary path to the secondary path via security appliance 12.

As long as the tape remains on the tape drive 311 (NO), 312, the data from the host may be encrypted and stored on the tape. When the tape is unloaded 313 (YES), or taken off the physical tape drive system, and the Atape drive is enabled in step 314, the security appliance 10 in step 316 broadcasts the encryption information to those security appliances clustered with security appliance 10. If there is no tape on the tape drive, the encryption key held in security appliance 10 may be allowed to expire. The process then returns as in step 300. When a new tape is loaded, the operation repeats. In one example, the security appliances may routinely broadcast, e.g. on a timed "heartbeat," to each other, via the Ethernet, to keep the others informed of those tape systems in the cluster.

Steps 304 and 314, (tape failover drive Enabled), illustrate a feature of this embodiment. Each security appliance (10, 12, etc.) can be configured to not respond to the Atape driver operation, that is, the security appliances do not broadcast the encryption information to clustered security appliances, and, so, if the Atape driver enables another path with a security appliance, the backup operation will fail due to lack of encryption information as explained above.

Figure 4:
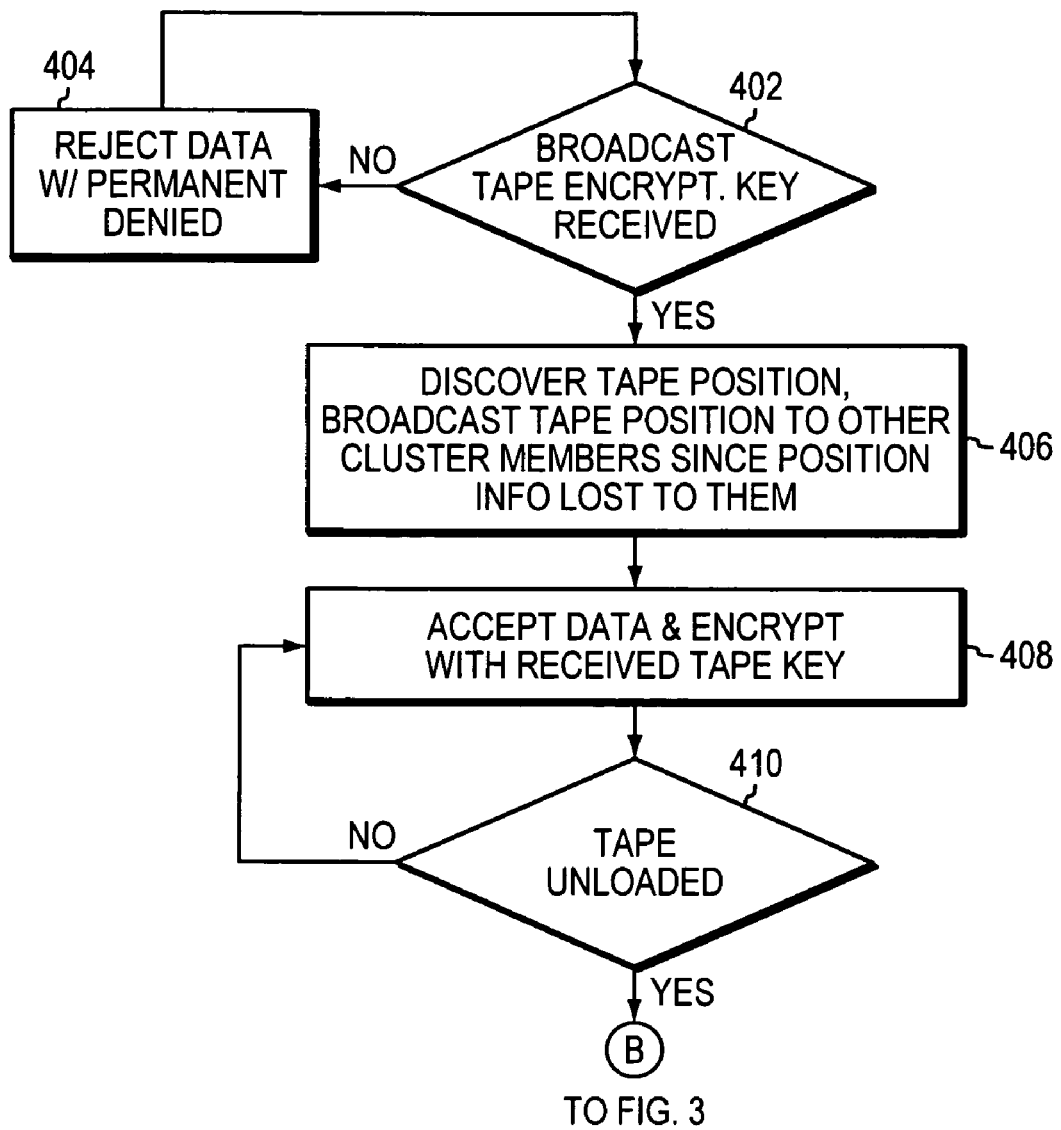

FIG. 4 illustrates a process executed at security appliance 12 when enabled as an alternative path by Atape driver. In this case, security appliance 10 had already broadcast its encryption information to security appliance 12. If, for some reason, a broadcast containing the tape encryption key, step 402, from security appliance 10 was not received, any data received from the host via security appliance 12 is rejected in step 404. However, if the tape encryption key has been received from security appliance 10, the security appliance in step 406 forces the host to discover the current tape position. Once the host issues a command to discovery position, the process continues at step 408, where the security appliance by accepts data from the host system and encrypts and stores it on the tape. When the host requires the contents of the tape to be restored from the tape, the security appliance 12 receives such a command and retrieves the data from the tape, decrypts it and returns it to the host system. When the tape is unloaded, the process continues as at point B in FIG. 3. The security appliance 12 broadcasts the encryption operation to the cluster and expires the encryption key. The security appliance then waits for a host system write to block 0. In one example, security appliance 12 may initially be in the primary path, but, after a failover that is resolved, security appliance 10 may 1 be in the primary path.

Figure 5:
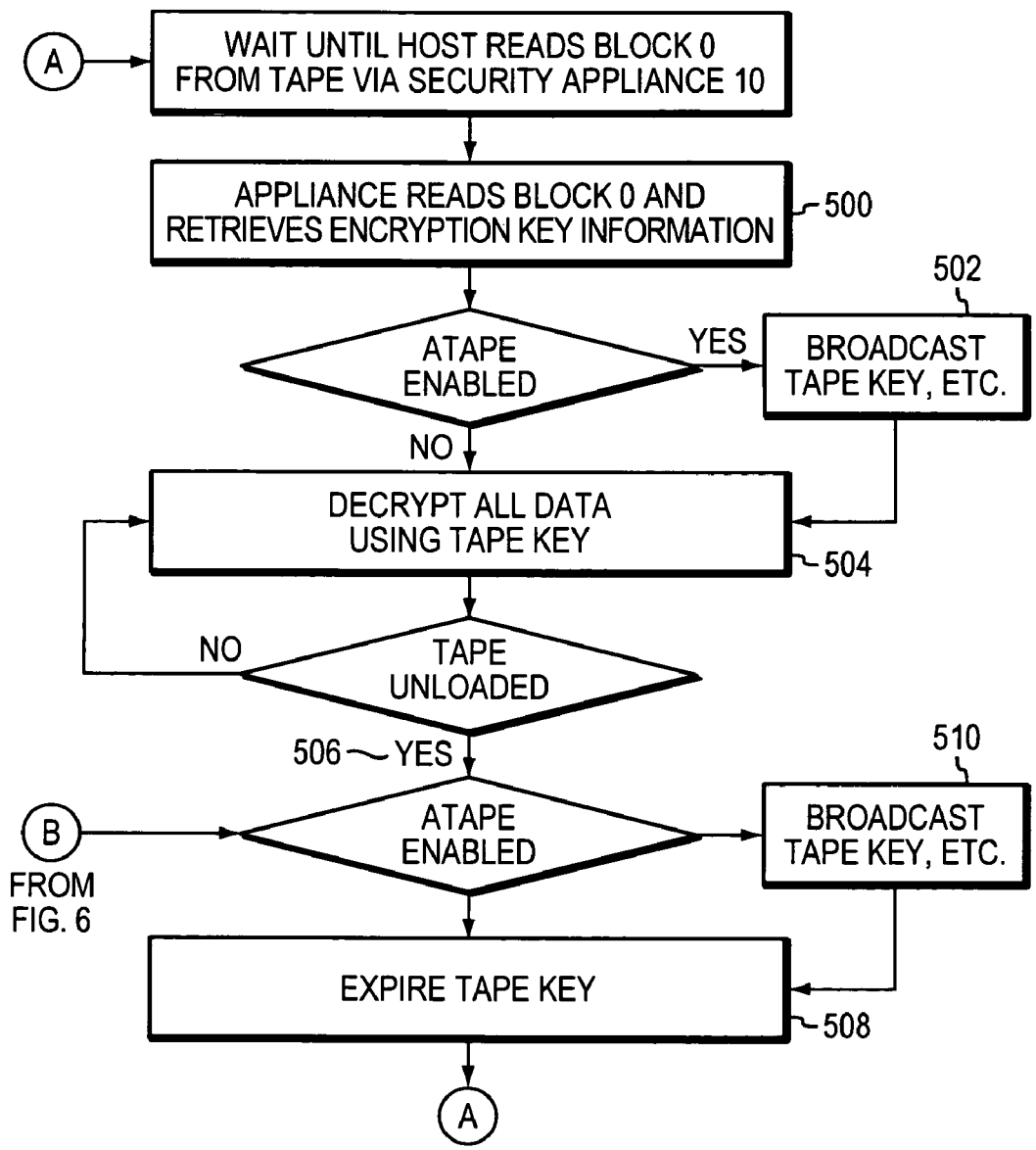
Figure 6:
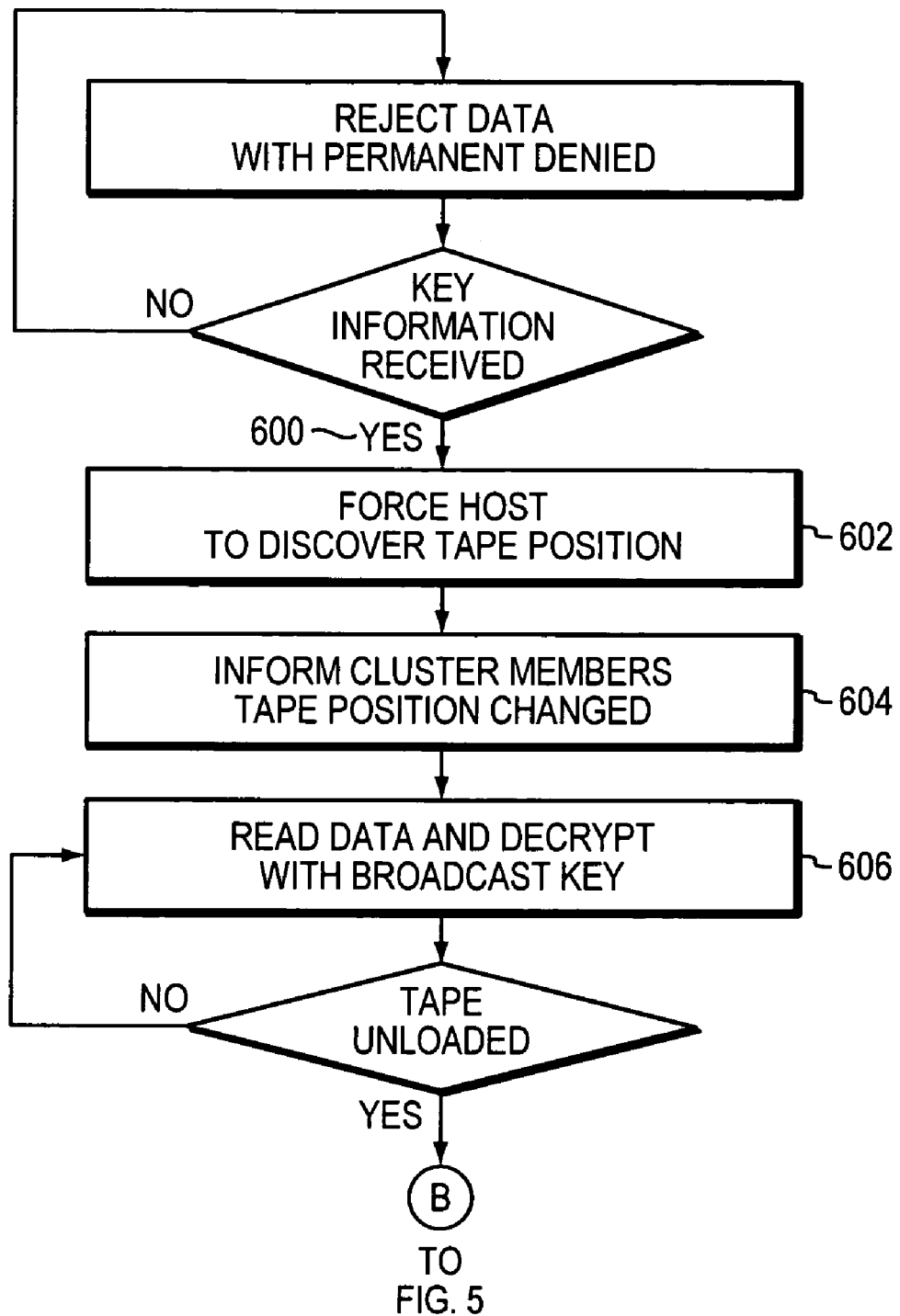

FIGS. 5 and 6 are representative flow charts for the case of data being read from a tape. The flow is very similar to the case of a write and many parallels exist. When the host loads a new tape, it first reads block 0. When this block is read, the security appliance retrieves encryption key information from the block 500. This information is broadcast 502 to all other cluster members. As long as the tape remains in the drive, data on the tape continues to be decrypted 504. If the tape is ejected 506, the key is expired 508 and this expiration is broadcast 510 to the other cluster members. On a failover event 600, the new path forces the host to discover the current tape position 602. Once the position is known 604, the process continues with the host reading data and the security appliance decrypting it 606.

When the system described in the FIGS. 1-6 is initialized, the security appliances are clustered and are configured via the Ethernet cable 19, as shown, to share information, including encryption keys and system information that the administer might determine. In the configuration of FIG. 1, the system may be initialized by an administrator manually entering identifiers of which tape system and which host is connected to each security appliance in a cluster. The information may be entered as a data structure illustratively embodied as a table within the security appliance. Later, the host system writes to block 0 and the security appliance in the primary path broadcasts the encryption information keys it uses for encryption/decryption along with its stored designators for its host and tape systems. All the clustered security appliances receive that information, and those clustered appliances connected to the same host and tape system may be the alternative path enabled by the Atape drive system. When a failover occurs in the primary path, the Atape driver will enable an alternative path, but the tape position may be lost. Even though the Atape driver retains the tape position, the primary security appliance may have acknowledged successful data block that was, in fact, not successfully stored. That is, the security appliance may have issued an early ACK (acknowledge). In this example, the secondary security appliance sends to the Atape driver a SCSI "check condition" command, with a sense code indicating that the tape position is lost. Note that the security appliance is connected to both the host and the tape system via FC. In this context, the FC is adapted to operate in a block access protocol. In this case, an SCSI protocol encapsulation—FC, e.g., FCP. SCSI is a peripheral I/O (Input/Output) interface with a standard, device independent protocol allowing many types of peripheral devices (disks, tapes) to attach to the host, or client. The Atape driver, in response, searches for and finds the correct tape position. If that position is the end of the last successful data block transferred, and when the tape is so positioned, the Atape driver sends the last (failed) data block (as described above for the Atape driver). The security appliance in the alternative path will have all the encryption information needed to continue the back up operation seamlessly. The host, Atape driver, security appliance and tape system may be arranged so that only the security devices on alternative paths to the tape system are clustered on one Ethernet cable. In such a case, any primary path giving up operation to a secondary path broadcasts the encryption information to the security appliances on the Ethernet, since the host and tape systems are already known (from initialization) to each to security appliance.

Here, the security appliances are connected by FC links on both their host and storage sides. Any new FC device discovered by the security appliance on one side, say the host side, is reported to the device on the other, the tape system, side. The FC devices are identified by both a WWN (World Wide Number) and an LUN (Logic Unit Number) that have been assigned by an administrator. The clustered security appliances, as discussed above, communicate over the Ethernet, in this example, using the IP protocol.

Typically, the host is the initiator and the storage device is the target that responds to the host's commands. Both the host and the tape system have end point addresses that, as in FC protocol, include WWN as an eight byte number and an LUN.

In other embodiments, the security appliance may scan and detect connected tape systems by having a library of WWNs and LUNs designating tape systems. The security appliance may then be scanned by a host, where the security appliance returns the tape WWN and LUN. The host scans and finds the tape system transparently with respect to the security appliance. However, the security appliance may, if set up initially by an administrator, return its own WWN and LUN identifier to the host and, in effect, disable the Atape driver operation. In this arrangement, the host can still access the tape system, even if the tape system was not initialized (block 0) by the security appliance. However, in this instance the alternative paths operation by the Atape driver may be thwarted.

When implementing the present invention, the receipt of data by the security appliance, and its acknowledgment of that receipt, may cause a limitation if a failure occurs between the security appliance and the tape system. In such a case, the host will have incorrect information about the number of blocks successfully written to the tape. When the switch to the alternate path occurs, the host, via Atape driver, will position the tape farther along the tape than the actual number of successfully written blocks on the tape. If this occurs, the AIX-operating system will read a blank and the system should fail. However, the system may, via the alternative path, always rewind one block, read that block if present and then continue.

The above discussion includes use of the AIX operating system and the Atape driver. However, the present invention may be advantageously used with virtually any tape failover system running under virtually any operating system. The present invention is not specific to one tape driver and/or one operating system.

It will be apparent to those skilled in the art that other processing and memory means, including various computer readable media, may be used for storing and executing program instructions pertaining to the invention described herein.

What is claimed is:

1. A failover security system for a host system with at least two paths to a back up tape storage system, wherein the host system is arranged to enable a single primary path among the paths and detect a failover in the primary path and, in response, send data to the tape system via an alternative path, the security system comprising:
    at least two security appliances each comprising a processor and a memory, with one arranged in the primary path and one in the alternative path between the host and the tape system, wherein the security appliance in the primary path intercepts data transfers between the host and the tape system, and wherein the security appliance encrypts data from the host and stores that encrypted data onto the tape system, and correspondingly, decrypts encrypted data from the tape system and delivers unencrypted data to the host;
    a communication channel among or between the at least two security appliances; and
    wherein when a tape is initialized by the host, an encryption key is generated in the security appliance in the primary path, and that encryption key is broadcast to the other security appliances via the communication channel.

2. The failover security system of claim 1 further comprising routinely broadcasting the encryption key to the other security appliances.

3. The failover security system of claim 1 further comprising:
    additional security appliances connected to the communications channel, and arranged between other hosts and other tape systems;
    storage in each of the two and additional security appliances, wherein the storage contains logic designators of each of the hosts and the tape systems; and
    wherein when the tape in the tape system is initialized, the primary security appliance broadcasts the encryption information and the designators of the host and tape system associated with the primary path.

4. The failover security system of claim 3 wherein the logical designators include a World Wide Number and a Logical Unit Number.

5. The failover security system of claim 1 wherein the security appliance generates the encryption key.

6. The failover security system of claim 1 further comprising a source of encryption keys, wherein when the tape is initialized, the primary security appliance retrieves encryption keys from that source.

7. The failover security system of claim 1 wherein the primary security appliance stores encryption information onto the tape when the tape is initialized.

8. The failover security system of claim 1 further comprising a first host bus adapter on the host system and a second host bus adapter on the security appliance communicating with each other via the primary path, and, if enabled, third and fourth host bus adapters on the host system and the security appliance communicating with each other via the alternative path, wherein the security appliances are transparent to the host.

9. The failover security system of claim 8 further comprising corresponding host bus adapters on the tape system and on the security appliances communicating with each other in the primary and in the alternative paths, wherein the security appliances are transparent to the tape system.

10. The failover system of claim 1 wherein the communication channel comprises an Ethernet channel.

11. The failover system of claim 1 wherein the host system determines that an error has occurred along the primary path, wherein the host system disables the security appliance in the primary path and enables the security appliance in the secondary path.

12. The failover system of claim 1 wherein the at least two security appliances comprises a security appliance in the primary path and at least five security appliances in at least five corresponding secondary paths from the host and the tape system.

13. A method for disabling a primary communication path and enabling a secondary communication path between a host and a tape system, each path having an in-line security appliance interconnected as a cluster, wherein each in-line security appliance comprises a processor and a memory, the method comprising:
    intercepting data transfers along the primary communication path between the host and the tape system, wherein the in-line security appliance, comprising the processor and the memory, encrypts data from the host and stores that encrypted data onto the tape system, and correspondingly, decrypts encrypted data from the tape system and delivers unencrypted data to the host;
    initializing a tape in the tape system;
    generating an encryption key in the security appliance in the primary communication path, and
    broadcasting the encryption key to the other security appliances over a communication channel between the in-line security appliance and the other security appliances in response to initializing the tape in the tape system and generating the encryption key.

14. The method of claim 13 wherein broadcasting the encryption key to the other security appliances further comprises routinely broadcasting the encryption key to the other security appliances.

15. The method of claim 13 further comprising:
labeling the host and the tape systems with logical designators, and broadcasting the logical designators to the other security appliances.

16. The method of claim 15 wherein the logical designators include a WWN and a LUN.

17. The method of claim 13 further comprising generating the encryption key when the tape is initialized.

18. The method of claim 13 wherein the security appliance generates the encryption key.

19. The method of claim 13 further comprising:
generating the encryption key at a storage encryption server; and
retrieving the encryption key from the storage encryption server by the security appliance.

20. The method of claim 13 further comprising:
communicating from a first host bus adapter on the host system to a second host bus adapter on the security appliance via the primary communication path; and
if enabled, communicating from a third host bus adapter on the host system and a fourth host bus adapter on the security appliance via the secondary path, wherein the communicating appears transparent to the host system.

21. The failover security system of claim 20 further comprising corresponding host bus adapters on the tape system and on the security appliances communicating with each other in the primary communication path and the secondary communication path, wherein the security appliances appear transparent to the tape system.

22. The method of claim 13 further comprising:
detecting an error in the data transfer along the primary communication path,
in response to the detecting, disabling the security appliance in the primary path, and
enabling the security appliance in the secondary communication path to encrypt and decrypt data between the host and the tape system.

23. A non-transitory computer readable medium containing executable program instructions executable by a processor, comprising:
program instructions that intercept data transfers along a primary path between a host and a tape system, wherein an in-line security appliance, comprising a processor and a memory, encrypts data from the host and stores that encrypted data onto the tape system, and correspondingly, decrypts encrypted data from the tape system and delivers unencrypted data to the host;
program instructions that initialize a tape in the tape system;
program instructions that generate an encryption key in the security appliance in the primary path; and
program instructions that broadcast the encryption key to other security appliances in a cluster over a communication channel between the in-line security appliance and the other security appliances in response to initializing the tape in the tape system and generating the encryption key.

* * * * *